(12) United States Patent
Luedtke et al.

(10) Patent No.: US 9,087,418 B2
(45) Date of Patent: Jul. 21, 2015

(54) VEHICLE DIAGNOSTIC SYSTEM AND METHOD FOR DETECTING INCORRECT CABLE CONNECTIONS

(71) Applicant: Ford Global Technologies, LLC, Dearborn, MI (US)

(72) Inventors: Daniel Richard Luedtke, Beverly Hills, MI (US); Fazal Urrahman Syed, Canton, MI (US); Jonathan Andrew Butcher, Farmington, MI (US); Rimma Paransky, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/083,589

(22) Filed: Nov. 19, 2013

(65) Prior Publication Data

US 2015/0142228 A1   May 21, 2015

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)
*G07C 5/00* (2006.01)

(52) U.S. Cl.
CPC .................................. *G07C 5/00* (2013.01)

(58) Field of Classification Search
CPC ..... B60W 20/00; B60W 10/08; B60W 10/06; Y02T 10/6286; B60K 6/445
USPC .......................................................... 701/22
See application file for complete search history.

(56) References Cited

U.S. PATENT DOCUMENTS

| 6,064,172 | A | 5/2000 | Kusnetsov |
| 7,482,769 | B2 * | 1/2009 | Kutsuna et al. ............ 318/254.1 |
| 7,483,796 | B2 | 1/2009 | McLaughlin et al. |
| 7,586,285 | B2 | 9/2009 | Gunji |
| 8,149,127 | B2 | 4/2012 | Montena |
| 2011/0054721 | A1 | 3/2011 | Goodrich et al. |

FOREIGN PATENT DOCUMENTS

GB            749669        5/1956

* cited by examiner

*Primary Examiner* — Maceeh Anwari
(74) *Attorney, Agent, or Firm* — Carlson, Gaskey & Olds

(57) ABSTRACT

A method according to an exemplary aspect of the present disclosure includes, among other things, controlling a vehicle in response to a diagnostic test performed to detect an incorrect cable connection of the vehicle.

19 Claims, 4 Drawing Sheets

VEHICLE DIAGNOSTIC SYSTEM AND METHOD FOR DETECTING INCORRECT CABLE CONNECTIONS

TECHNICAL FIELD

This disclosure relates to an electrified vehicle, and more particularly, but not exclusively, to a vehicle diagnostic system and method for detecting incorrect electric machine cable connections within electrified vehicles.

BACKGROUND

Hybrid electric vehicles (HEV's), plug-in hybrid electric vehicles (PHEV's), battery electric vehicles (BEV's), fuel cell vehicles and other known electrified vehicles differ from conventional motor vehicles in that they are powered by one or more electric machines (i.e., electric motors and/or generators) instead of or in addition to an internal combustion engine. High voltage current is typically supplied to the electric machines by one or more batteries that store electrical power.

Electric machines are commonly employed as part of an electric drive system of an electrified vehicle. Proper connections between the various components of the electric drive system are necessary in order to avoid electric machine control errors that can result in operating abnormalities.

SUMMARY

A method according to an exemplary aspect of the present disclosure includes, among other things, controlling a vehicle in response to a diagnostic test performed to detect an incorrect cable connection of the vehicle.

In a further non-limiting embodiment of the foregoing method, the method of controlling the vehicle includes limiting operation of the vehicle in response to detecting the incorrect cable connection.

In a further non-limiting embodiment of either of the foregoing methods, the method of controlling the vehicle includes preventing operation of the vehicle in response to detecting the incorrect cable connection.

In a further non-limiting embodiment of any of the foregoing methods, the method of controlling the vehicle includes allowing normal operation of the vehicle in response to detecting a correct cable connection.

In a further non-limiting embodiment of any of the foregoing methods, the diagnostic test includes communicating an excitation signal to an electric machine of the vehicle and analyzing a response signal from the electric machine to detect the incorrect cable connection.

In a further non-limiting embodiment of any of the foregoing methods, the method of analyzing includes comparing a magnitude and phase of the response signal to a predefined error threshold.

In a further non-limiting embodiment of any of the foregoing methods, the excitation signal is a torque excitation signal and the response signal is a speed response signal.

In a further non-limiting embodiment of any of the foregoing methods, the method of analyzing includes applying a Fourier transform to the response signal.

In a further non-limiting embodiment of any of the foregoing methods, the diagnostic test is performed in response to a first Key-On event of the vehicle.

In a further non-limiting embodiment of any of the foregoing methods, the diagnostic test is not performed during subsequent Key-On events of the vehicle subsequent to a PASS signal of the diagnostic test.

In a further non-limiting embodiment of any of the foregoing methods, the method includes re-running the diagnostic test in response to a service action.

In a further non-limiting embodiment of any of the foregoing methods, the diagnostic test is performed in response to a Key-On event and prior to vehicle shipment from a manufacturing plant.

A vehicle control method according to another exemplary aspect of the present disclosure includes, among other things, communicating a torque excitation signal to an electric machine of a vehicle and processing a response signal from the electric machine to identify whether an incorrect cable connection exists between the electric machine and a second vehicle component.

In a further non-limiting embodiment of the foregoing method, the second vehicle component includes an inverter.

In a further non-limiting embodiment of either of the foregoing methods, the step of processing includes comparing a magnitude and phase of the response signal to a predefined error threshold.

In a further non-limiting embodiment of any of the foregoing methods, the method includes preventing operation of the vehicle if the magnitude and phase of the response signal exceed the predefined error threshold.

In a further non-limiting embodiment of any of the foregoing methods, the method includes allowing normal operation of the vehicle if the magnitude and phase of the response signal are within the predefined error threshold.

A vehicle diagnostic system according to another exemplary aspect of the present disclosure includes, among other things, an electric machine, an inverter, three-phase cables that connect the electric machine to the inverter, and a control unit configured to execute a diagnostic test to detect an incorrect connection of the three-phase cables.

In a further non-limiting embodiment of the foregoing system, the control unit is configured to communicate a torque excitation signal to the electric machine.

In a further non-limiting embodiment of any of the foregoing methods, the control unit is configured to process a response signal from the electric machine.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a vehicle diagnostic system and method for detecting incorrect cable connections within an electrified vehicle. In one embodiment, the inventive vehicle diagnostic system may be used to execute a diagnostic test for detecting incorrect electric machine cable connections. A speed response signal of the electric machine is processed in order to determine the magnitude and phase of the response signal responsive to a torque excitation signal supplied to the electric machine. If the measured speed response falls within a predefined error threshold, the cables are connected correctly. However, if outside the predefined error threshold, the cables are connected incorrectly. The vehicle may be controlled in some manner in response to detecting an incorrect cable connection.

Figure 1:
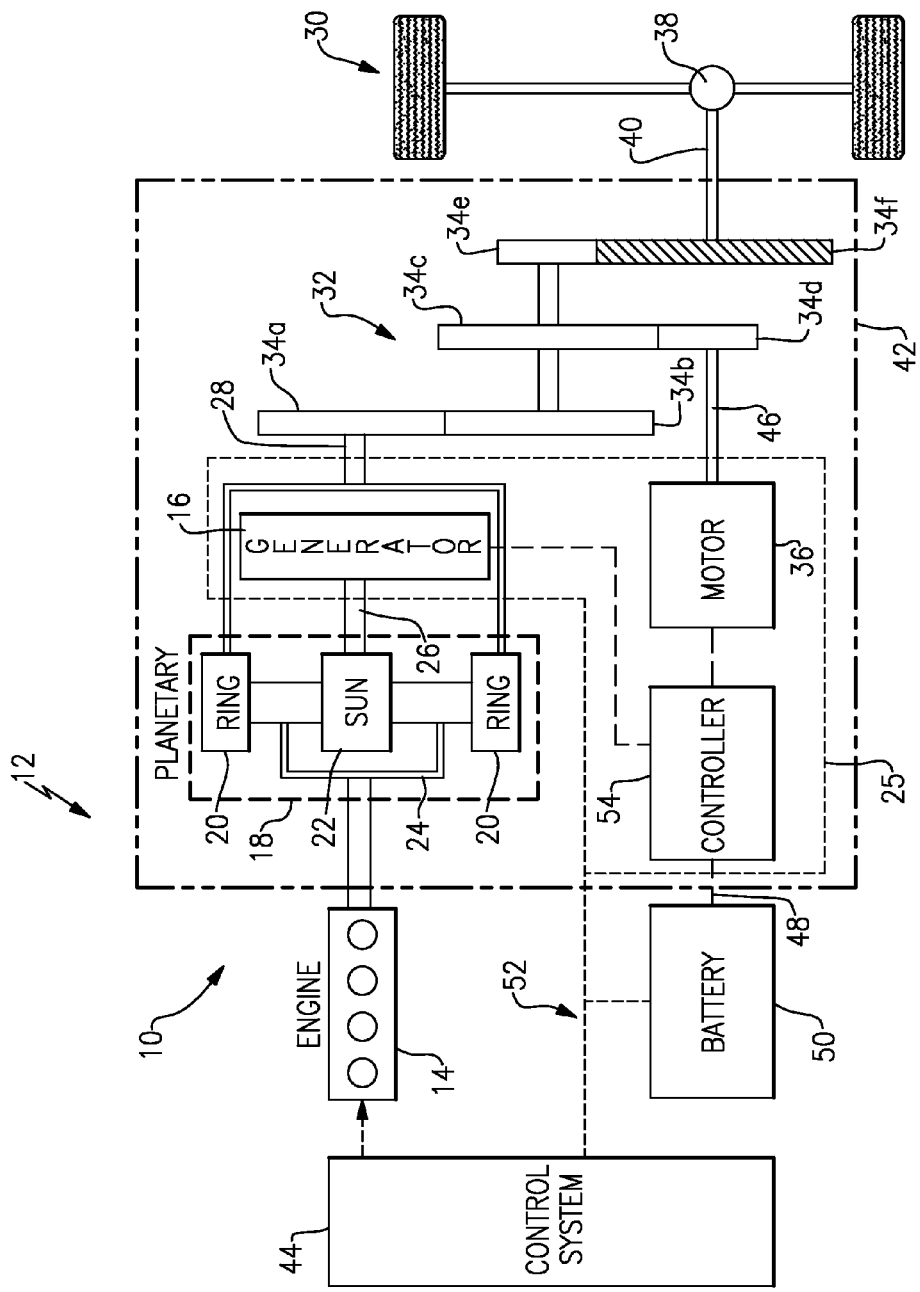
FIG. 1 schematically illustrates a powertrain of an electrified vehicle.

FIG. 1 schematically illustrates a powertrain 10 for an electrified vehicle 12, such as a HEV. Although depicted as a HEV, it should be understood that the concepts described herein are not limited to HEV's and could extend to other electrified vehicles, including but not limited to, PHEV's, BEV's, and fuel cell vehicles.

In one embodiment, the powertrain 10 is a power split system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electrified vehicle 12.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50. The battery 50 may be a high voltage battery that is capable of outputting electrical power to operate the motor 36 and the generator 16. Other types of energy storage devices and/or output devices can also be incorporated for use with the electrified vehicle 12.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 could also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

Figure 2:
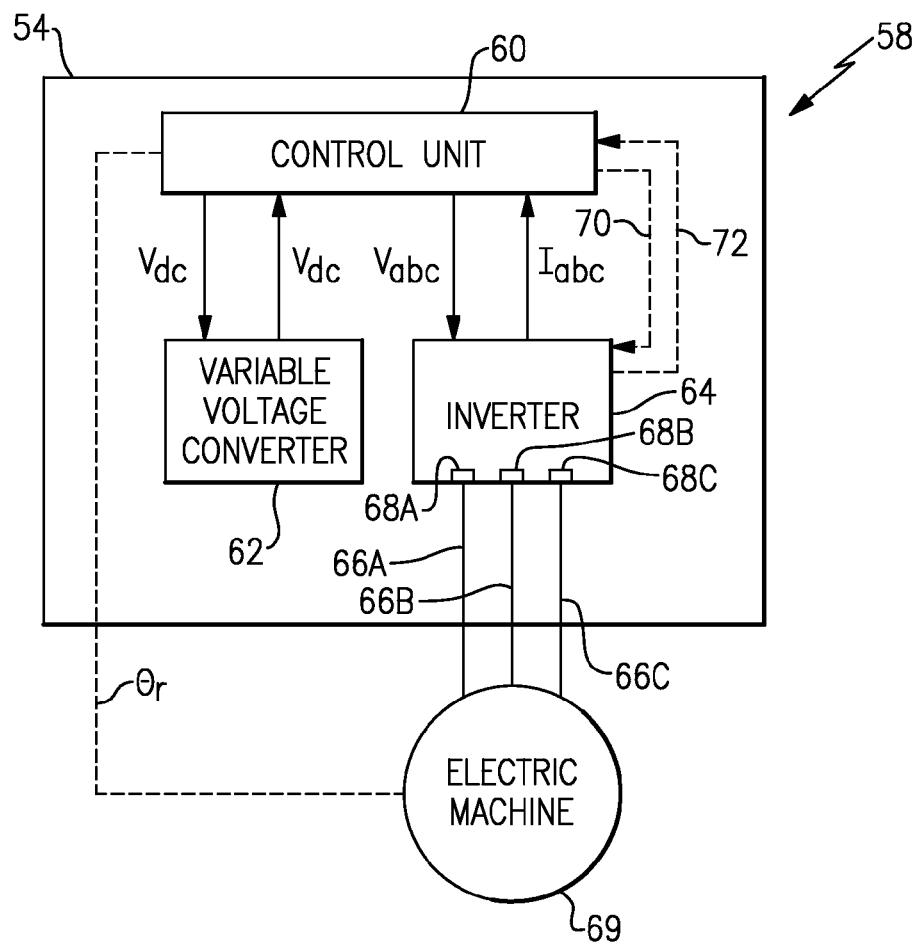
FIG. 2 illustrates a vehicle diagnostic system.

FIG. 2 illustrates a vehicle diagnostic system 58 that can be incorporated into a vehicle, such as the electrified vehicle 12 of FIG. 1. The vehicle diagnostic system 58 can be used to detect incorrect cable connections associated with an electric machine 69 (i.e., a motor or generator). In one embodiment, the vehicle diagnostic system 58 is incorporated as part of the electric drive system 25 of the electrified vehicle 12. It should be understood; however, that the electric drive system 25 could have additional electric machines beyond the one shown in FIG. 2.

In one embodiment, the vehicle diagnostic system 58 includes an electric machine 69, a control unit 60, a variable voltage converter 62 and an inverter 64. Of course, this view is highly schematic, and it should be understood that additional hardware and software may make up the vehicle diagnostic system 58. In one embodiment, the control unit 60, the variable voltage converter 62 and the inverter 64 are part of the controller 54 (see FIG. 1). Alternatively, these components could be separate from the controller 54.

As is known, the control unit 60 may control three-phase current in the electric machine 69 by commanding three-phase voltages $V_{abc}$ to the inverter 64 and measuring the three-phase current $I_{abc}$ and rotor position data $\theta_r$ as feedback from the inverter 64 and the electric machine 69, respectively. The variable voltage converter 62 may be used to convert a control signal from the control unit 60 to an appropriate voltage level for controlling the inverter 64. For example, in one embodiment, the variable voltage converter 62 is a step-up/step-down converter that steps the DC voltage that originates from a DC power supply (i.e., the battery 50 of FIG. 1 or some other power supply) up or down so that the control unit 60 can control the inverter 64.

In response to receiving a control signal from the control unit 60, the inverter 64 converts the DC voltage into three-phase AC voltage and outputs the three-phase AC voltage to the electric machine 69. The inverter 64 may also operate in the reverse by converting three-phase AC voltage into DC voltage, such as for charging the DC power supply. The electric machine 69 is driven and controlled by the three-phase AC voltage to generate an output torque for driving the vehicle drive wheels 30 of the electrified vehicle 12, in this embodiment.

In one embodiment, the three-phase AC voltage is communicated between the electric machine 69 and the inverter 64 over three-phase cables 66A, 66B and 66C. For example, a first cable 66A connects to a first input 68A of the inverter 64, a second cable 66B connects to a second input 68B of the inverter 64, and a third cable 66C connects to a third input 68C of the inverter 64. The first cable 66A communicates a first phase of the three-phase AC voltage, the second cable 66B communicates a second phase of the three-phase AC voltage, and so on.

Connecting any of the three-phase cables 66A, 66B or 66C to the incorrect input 68A, 68B or 68C can result in reverse torque production, thereby causing the vehicle to move in a direction opposite of the intended motion. For example, incorrect torque may be generated by connecting the cable 66A to the input 68B, or by connecting the cable 66C to the input 68A, etc. The vehicle diagnostic system 58 and the diagnostic test described below are intended to detect such incorrect cable connections and command the electrified vehicle 12 in a certain manner in response to any such detection.

The vehicle diagnostic system 58 may execute a vehicle control method. For example, the vehicle diagnostic system 58 may employ one or more algorithms programmed into the control unit 60 and use special processing of feedback signals from the electric machine 69 as part of a diagnostic test for determining whether an incorrect cable connection exists within the electrified vehicle 12. In one non-limiting embodiment, the control unit 60 communicates an excitation signal 70 to the electric machine 69 (through the inverter 64) and analyzes a response signal 72 from the electric machine 69 in order to detect incorrect connection of the three-phase cables 66A, 66B and 66C.

Figure 3:
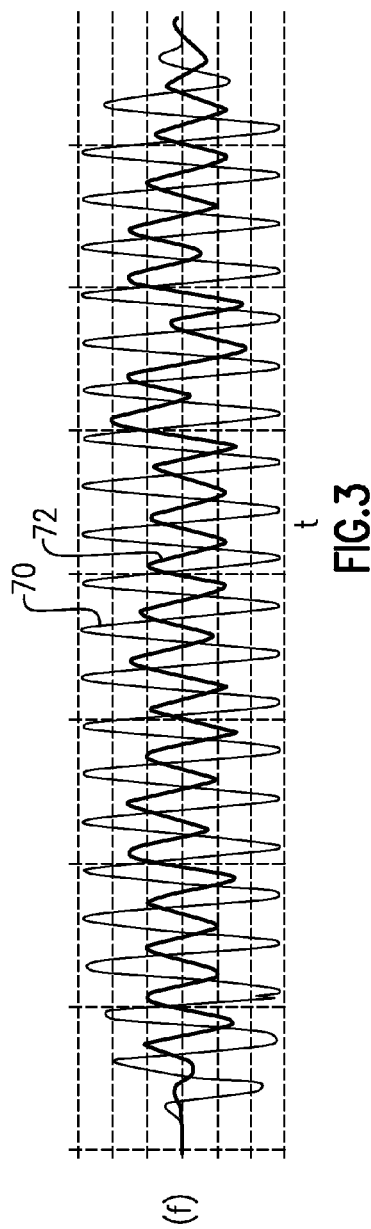
FIG. 3 is a graphical representation of a time domain torque excitation and speed response associated with an electric machine.

FIG. 3, with continued reference to FIG. 2, graphically illustrates the excitation signal 70 and the response signal 72. In one embodiment, the excitation signal 70 is a torque excitation signal from the control unit 60 and the response signal 72 is a speed response signal of the electric machine 69 that is responsive to the torque excitation signal. The excitation signal 70 is generally at a frequency (f) that is sufficiently higher than the natural resonance of the electric machine 69 so that the response signal 72 is repeatable and robust to noise factors. In one non-limiting embodiment, the excitation signal has a frequency between 20 Hertz and 60 Hertz. Other frequency ranges are also contemplated within the scope of this disclosure.

Figure 4:
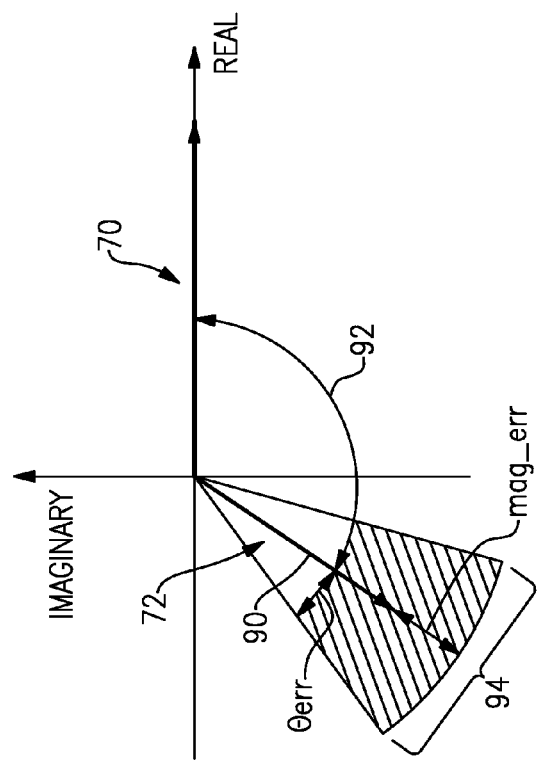
FIG. 4 illustrates the real and imaginary parts of the Fourier transform of the excitation and response signals of FIG. 3.

Referring to FIG. 4, with continued reference to FIGS. 2 and 3, the excitation signal 70 and the response signal 72 may be represented in vector form in order to be more easily analyze and process these signals using the control unit 60 of the vehicle diagnostic system 58. In one embodiment, a Fourier transform may be applied to the excitation signal 70 and the response signal 72 in order to examine the Real (illustrated along the X-axis) and Imaginary (illustrated along the Y-axis) parts of the Fourier transform of these signals.

Processing the response signal 72 in this manner enables the extraction of a magnitude 90 and a phase 92 of the response signal 72. If the measured magnitude 90 and phase 92 of the response signal 72 fall within a predefined error threshold 94, the three-phase cables 66A, 66B and 66C (see FIG. 2) are connected correctly. The predefined error threshold 94 takes into account acceptable amounts of magnitude error (mag_err) and phase error (phase_err) to determine an acceptable range of the response signal 72. The actual range of the predefined error threshold 94 may vary depending on the design of the electric machine 69, among other criteria. If outside the predefined error threshold 94, the three-phase cables 66A, 66B and 66C are connected incorrectly.

Figure 5:
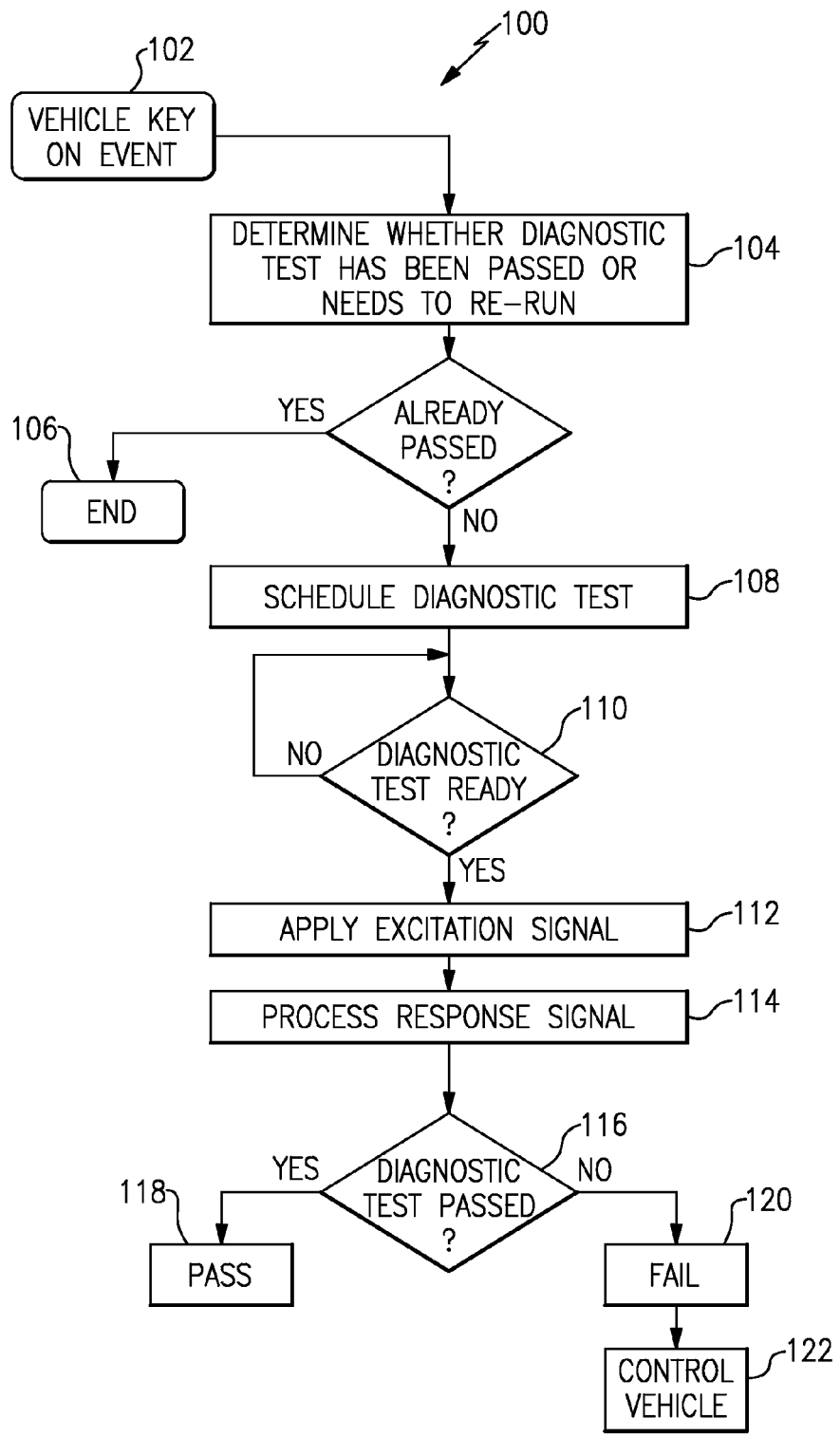
FIG. 5 schematically illustrates a vehicle diagnostic method that can detect an incorrect electric machine cable connection.

FIG. 5, with continued reference to FIGS. 1-4, schematically illustrates a vehicle diagnostic test method 100 for detecting incorrect cable connection connections within an electrified vehicle 12. In one embodiment, the method 100 may be executed as a diagnostic test performed by the vehicle diagnostic system 58.

The method 100 begins at a vehicle Key-On event at block 102. In one embodiment, the vehicle Key-On event occurs in a manufacturing plant prior to shipment of the electrified vehicle 12 for sale to a consumer. The method 100 would generally not run during successive Key-On events. However, the control unit 60 could be programmed to re-run the method 100 after certain service actions or after certain three-phase cable faults.

The method 100 next proceeds to block 104. At block 104, the control unit 60 of the vehicle diagnostic system 58 determines whether the diagnostic test (i.e., the method 100) has been previously passed or needs to run again. If previously passed, the vehicle diagnostic method 100 is not requested and the method 100 ends at block 106. If not previously passed, the vehicle diagnostic method 100 is requested and proceeds to block 108 by scheduled the diagnostic test to run.

If confirmation is received at block 110 that the vehicle diagnostic method 100 is set to run, the control unit 60 commands that the excitation signal 70 be applied to the electric machine 69 at block 112. The response signal 72 from the electric machine 69 is processed by the control unit at block 114. As detailed above, the response signal 72 may be processed by applying a Fourier transform and extracting the magnitude and phase of the response signal 72.

Next, at block 116, it is determined whether the vehicle diagnostic method 100 has been passed. During this step, the control unit 60 compares the magnitude and phase of the response signal 72 to a predefined error threshold 94. If within the predefined error threshold 94, the method 100 indicates a PASS signal at block 118. A PASS signal at block 118 is confirmation that the three-phase cables 66A, 66B and 66C are connected correctly. Normal operation of the electrified vehicle 12 is permitted in response to detecting correct connection of the three-phase cables 66A, 66B and 66C.

Alternatively, if the magnitude and phase of the response signal 72 are outside of the predefined error threshold 94, the method 100 indicates a FAIL signal at block 120. A FAIL signal at block 120 is confirmation that the three-phase cables 66A, 66B and 66C are incorrectly connected. The electrified vehicle 12 may be controlled at block 122 in response to a FAIL signal being communicated at block 120. In one embodiment, controlling the electrified vehicle at block 122 includes preventing or limiting operation of the electrified vehicle 12 until the cable connections can be corrected in a service operation.

The vehicle diagnostic system 58 and vehicle diagnostic method 100 described above are configured to actively excite the electric machine 69 in a safe and controlled manner and then observe a real physical response of the electric machine 69. If the electric machine 69 does not respond as expected, an incorrect cable connection is identified before the vehicle can move in an unexpected manner.

Although illustrated with respect to incorrectly connected 3-phase cables herein, the system and method of this disclosure could additionally or alternatively be used to detect incorrectly connected resolver position sensor cables (which may include excitation source/return, sine source/return and cosine source/return cables) or any other incorrectly connected cables that may lead to vehicle control errors.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
running a diagnostic test using a vehicle diagnostic system of a vehicle to detect an incorrect cable connection of the vehicle including communicating a torque excitation signal to an electric machine of the vehicle and detecting the incorrect cable connection based on a speed response signal from the electric machine; and
controlling the vehicle in response to detecting the incorrect cable connection.

2. The method as recited in claim 1, wherein the step of controlling the vehicle includes limiting operation of the vehicle in response to detecting the incorrect cable connection.

3. The method as recited in claim 1, wherein the step of controlling the vehicle includes preventing operation of the vehicle in response to detecting the incorrect cable connection.

4. The method as recited in claim 1, wherein the step of controlling the vehicle includes allowing normal operation of the vehicle in response to detecting a correct cable connection.

5. The method as recited in claim 1, wherein the step of analyzing includes comparing a magnitude and phase of the speed response signal to a predefined error threshold.

6. The method as recited in claim 1, wherein the step of analyzing includes applying a Fourier transform to the response signal.

7. The method as recited in claim 1, wherein the diagnostic test is performed in response to a first Key-On event of the vehicle.

8. The method as recited in claim 7, wherein the diagnostic test is not performed during subsequent Key-On events of the vehicle subsequent to a PASS signal of the diagnostic test.

9. The method as recited in claim 7, comprising re-running the diagnostic test in response to a service action.

10. The method as recited in claim 1, wherein the diagnostic test is performed in response to a Key-On event and prior to vehicle shipment from a manufacturing plant.

11. The method as recited in claim 1, wherein detection of the incorrect cable connection indicates that a cable of a set of three-phase cables is connected to an incorrect input of an inverter.

12. A vehicle control method, comprising:
running a diagnostic test including:
communicating a torque excitation signal to an electric machine of a vehicle; and
processing a speed response signal from the electric machine to identify whether an incorrect cable connection exists between the electric machine and a second vehicle component; and
controlling the vehicle in response to detecting the incorrect cable connection.

13. The method as recited in claim 12, wherein the second vehicle component includes an inverter.

14. The method as recited in claim 12, wherein the step of processing includes comparing a magnitude and phase of the speed response signal to a predefined error threshold.

15. The method as recited in claim 14, comprising preventing operation of the vehicle if the magnitude and phase of the speed response signal exceed the predefined error threshold.

16. The method as recited in claim 14, comprising allowing normal operation of the vehicle if the magnitude and phase of the speed response signal are within the predefined error threshold.

17. A vehicle diagnostic system, comprising:
an electric machine;
an inverter;
three-phase cables that connect said electric machine to said inverter; and
a control unit configured to execute a diagnostic test to detect an incorrect connection of said three-phase cables, the diagnostic test including communicating a torque excitation signal to said electric machine and detecting said incorrect connection based on a speed response signal from said electric machine.

18. The system as recited in claim 17, wherein said control unit is configured to control three-phase current in said electric machine by commanding three-phase voltages to said inverter and measuring three-phase current and rotor position as feedback from said inverter and said electric machine.

19. The system as recited in claim 17, wherein said three-phase cables include a first cable that communicates a first phase of a three-phase AC voltage to a first input of said inverter, a second cable that communicates a second phase of said three-phase AC voltage to a second input of said inverter, and a third cable that communicates a third phase of said three-phase AC voltage to a third input of said inverter.

* * * * *